(12) United States Patent
Novakovsky (10) Patent No.: US 9,367,464 B2
(45) Date of Patent: Jun. 14, 2016

(54) CACHE CIRCUIT HAVING A TAG ARRAY WITH SMALLER LATENCY THAN A DATA ARRAY

(75) Inventor: Larisa Novakovsky, Haifa (IL)

(73) Assignee: Intel Corporation, Santa Clara, CA (US)

( * ) Notice: Subject to any disclaimer, the term of this patent is extended or adjusted under 35 U.S.C. 154(b) by 191 days.

(21) Appl. No.: 13/997,655

(22) PCT Filed: Dec. 30, 2011

(86) PCT No.: PCT/US2011/068025
§ 371 (c)(1),
(2), (4) Date: Jun. 24, 2013

(87) PCT Pub. No.: WO2013/101151
PCT Pub. Date: Jul. 4, 2013

(65) Prior Publication Data
US 2014/0208035 A1    Jul. 24, 2014

(51) Int. Cl.
*G06F 12/08* (2006.01)
*G06F 13/16* (2006.01)

(52) U.S. Cl.
CPC ........ *G06F 12/0842* (2013.01); *G06F 12/0853* (2013.01); *G06F 12/0855* (2013.01); *G06F 12/0895* (2013.01); *G06F 13/1642* (2013.01)

(58) Field of Classification Search
None
See application file for complete search history.

(56) References Cited

U.S. PATENT DOCUMENTS

| 4,525,777 | A | * | 6/1985 | Webster et al. | 711/144 |
| 5,426,765 | A | * | 6/1995 | Stevens et al. | 711/131 |
| 5,579,504 | A | * | 11/1996 | Callander et al. | 711/144 |
| 5,692,152 | A | * | 11/1997 | Cohen et al. | 711/140 |
| 6,253,291 | B1 | | 6/2001 | Pong et al. | |
| 6,295,583 | B1 | * | 9/2001 | Razdan et al. | 711/137 |
| 6,389,517 | B1 | * | 5/2002 | Moudgal et al. | 711/146 |
| 6,928,517 | B1 | * | 8/2005 | Englin et al. | 711/122 |
| 7,035,958 | B2 | * | 4/2006 | Augsburg et al. | 710/310 |
| 7,822,037 | B2 | | 10/2010 | Denney et al. | |
| 2002/0016886 | A1 | * | 2/2002 | Pawlowski et al. | 711/118 |

FOREIGN PATENT DOCUMENTS

EP    0432524 A2 *    6/1991    .......... G06F 12/0859

OTHER PUBLICATIONS

Shen et al. Modern Processor Design. 2002. McGraw-Hill. Beta ed. pp. 355-356 and 445-446.*
Kang et al. CMOS Digital Integrated Circuits. 2003. McGraw-Hill. 3rd ed. pp. 230-241.*
Weiss et al. POWER and PowerPC. 1994. Mogan Kaufmann. pp. 168-170.*
PCT International Search Report for PCT Counterpart Application No. PCT/US2011/068025, 5 pgs., (Sep. 30, 2012).

(Continued)

*Primary Examiner* — Nathan Sadler
(74) *Attorney, Agent, or Firm* — Nicholson De Vos Webster & Elliott, LLP (57) ABSTRACT

A method is described that includes alternating cache requests sent to a tag array between data requests and dataless requests.

19 Claims, 7 Drawing Sheets

(56) References Cited

OTHER PUBLICATIONS

PCT Written Opionion of the International Searching Authority for PCT Counterpart Application No. PCT/US2011/068025, 3 pgs., (Sep. 30, 2012).

PCT Notification concerning Transmittal of International Preliminary Report on Patentability (Chapter I of the Patent Cooperation Treaty) for PCT Counterpart Application No. PCT/US2011/068025, 5 pgs., (Jul. 10, 2014).

\* cited by examiner

CACHE CIRCUIT HAVING A TAG ARRAY WITH SMALLER LATENCY THAN A DATA ARRAY

CROSS-REFERENCE TO RELATED APPLICATION

This patent application is a U.S. National Phase Application under 35 U.S.C. §371 of International Application No. PCT/US2011/068025, filed Dec. 30, 2011, entitled IMPROVED CACHE CIRCUIT HAVING A TAG ARRAY WITH SMALLER LATENCY THAN A DATA ARRAY.

FIELD OF INVENTION

The field of invention pertains to the computing sciences, and, more specifically to an improved cache circuit having a tag array with smaller latency than a data array

BACKGROUND

Figure 1A:
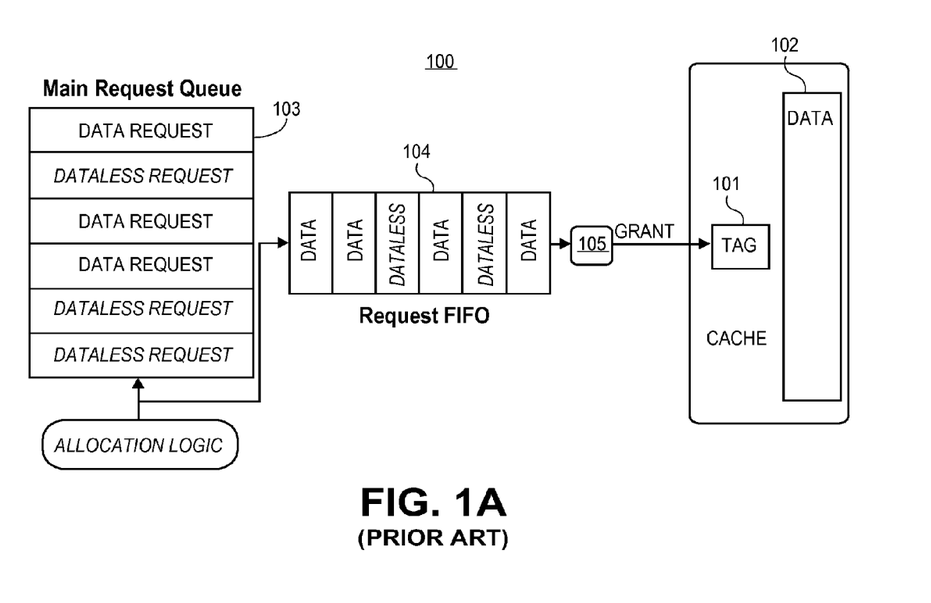
FIG. 1a shows a prior art cache circuit.
Figure 1B:
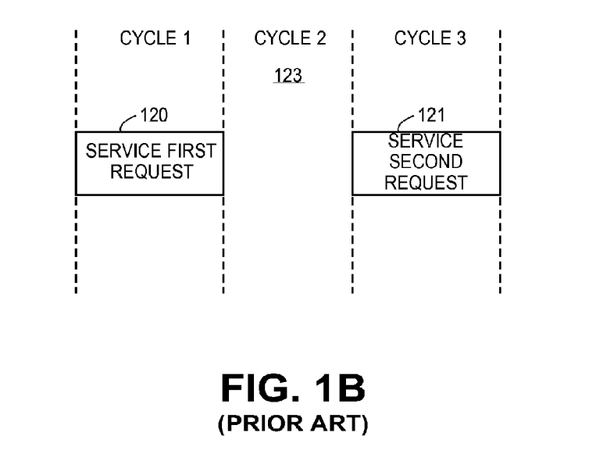
FIG. 1b shows timing associated with the prior art cache circuit.

FIG. 1a shows prior art cache circuitry 100 and FIG. 1b shows a timing diagram for the prior art cache circuitry. As observed in FIG. 1a, the prior art cache circuitry 100 includes a tag array 101 and a data array 102. The tag array 101 keeps "tags" (identifiers) of the cache lines that are kept in the data array 102. Under a common sequence of events, such as a "demand read", both the tag array 101 and the data array 102 are accessed as part of the same transaction. For example, in the case of a demand read, first the tag array 101 is accessed to see if the desired cache line is in the data array 102. If so (cache hit), the data array 102 is accessed to fetch the desired cache line.

According to a traditional design point, the data storage capacity of the data array 102 is desired to be large which corresponds to the use of smaller, but slower, data storage cells within the data array 102. As a consequence of the use of slower cells, two cycles are needed to access the data array 102. Moreover, the tag array 101 is traditionally implemented with the same type of storage cells as the data array 102. Hence, a complete sequence of first accessing the tag array 101 and then accessing the data array 102 (e.g., in the case of a cache hit) requires four cycles (2 cycles for the tag array access plus 2 more cycles for the data array access).

Because two cycles are needed to access the tag array 101, cache access requests can not be serviced on immediately consecutive cycles. That is, as observed in FIG. 1b, an immediately following cache access request 121 can not be serviced on a cycle that immediately follows a preceding cache access request 120. Rather, an entire cycle 123 must be "skipped" after the first request 120 before the second request 121 can be serviced.

Note that the prior art caching circuitry 100 also includes a main request queue 103 for queuing cache access requests. According to one approach, requests from the main queue 103 are fed into a FIFO 104 that directly supplies cache access requests to the tag array 102. According to one embodiment of this approach, requests are serviced in strict order according to their arrival to the main queue 103. Here, servicing logic 105 services requests from the FIFO 104 consistent with the timing discussed above with respect to FIG. 1b. That is, servicing logic 104 is designed to wait a full cycle after servicing a request from the FIFO 104 before servicing a next request from the FIFO 104.

In other approaches (not shown), the different sources of incoming cache access requests are serviced on a round robin basis. For example, a semiconductor chip that has four cores and two external links may have individual queues for each of the six sources (four cores and two links), and, the queues are fairly serviced on a round robin basis. Strict ordering of request services based on arrival to the cache circuitry need not be strictly adhered to according to this approach. Here again, because of the two cycle tag access requirement, even if round robin servicing is utilized, the servicing logic nevertheless will not service a next request until after a full cycle has elapsed since the serving of the most recently serviced request.

FIGURES

The present invention is illustrated by way of example and not limitation in the figures of the accompanying drawings, in which like references indicate similar elements and in which.

DETAILED DESCRIPTION

Some cache access requests do not require any access to the data array and instead only seek to access the tag array (e.g., to see if a requested cache line is present in the data array but without actually fetching the cache line if so). Examples include prefetch requests, snoops and memory execution unit (MEU) full line updates.

As such, waiting a full cycle between cache requests for requests that do not require access to the data array corresponds to a form of inefficiency in system operation—particularly if the tag array can be designed such that only one cycle is needed to access the tag array. A tag array that requires only one cycle per access can be accomplished, for example, by using larger (faster) storage cells in the tag array than are used in the data array. Here, because the tag array typically need not have the same (very large) storage capacity of the data array, the increase in size of the tag array owing to the incorporation of larger storage cells does not significantly contribute to a larger overall cache size.

Figure 2A:
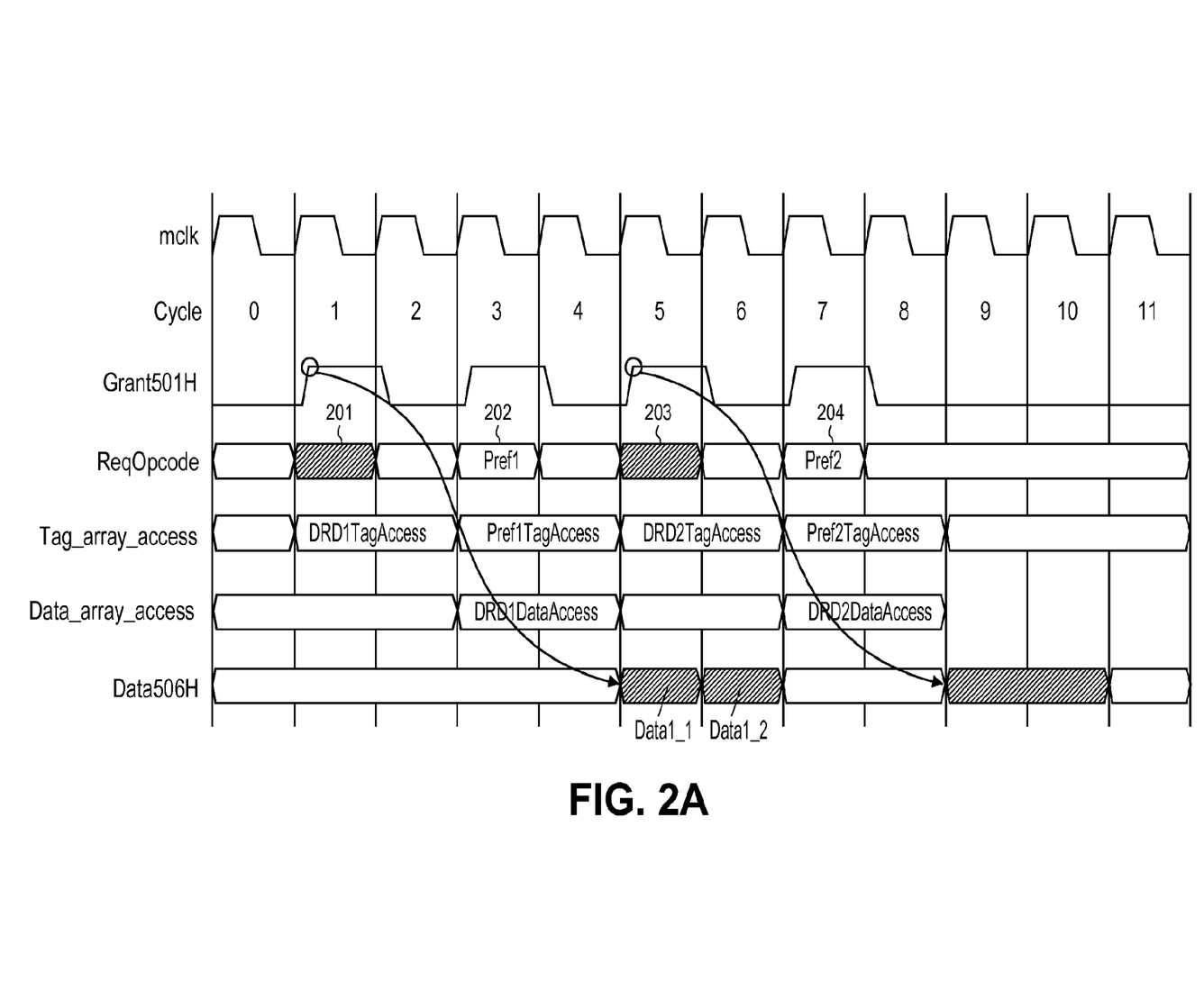
FIG. 2a shows more detailed timing of the prior art cache circuit.

As a matter of comparison, consider the prior art approach of FIG. 2a which shows operation when a full cycle is skipped between all requests for a sequence that includes: 1) a first read demand request 201; 2) a second, following prefetch request 202; 3) a third, read demand request 203; and, 4) a fourth, prefetch request 204. Here, the tag array is accessed for the first request 201 in cycles 1 and 2, and, the data array (assuming a cache hit) is accessed for the first request 201 in cycles 3 and 4. The second request 202 is not serviced until cycle 3 consistent with the requirement that a full cycle must be expended between consecutive requests (or, said another way, because the tag array access of the first request 201 consumes cycles 1 and 2).

As observed in FIG. 2a, the first request 201, being a read demand that hits in the tag array, consumes four total cycles (cycles 1 through 4) before the read data is finally presented at cycle 5. The second request 202, as discussed above, must wait until cycle 3 before it can be serviced owing to the 2 cycle consumption of the tag array by the first request 201. The second request 202 is a prefetch request and therefore does not access the data array (only the tag array). Thus, the second request 202 only consumes cycles 3 and 4 to be completely serviced.

The third request 203 is not serviced until cycle 5 owing to the two cycle consumption of the tag array by the second request over cycles 3 and 4. The third request 203 is also a demand read having a hit in the tag array access that occurs over cycles 5 and 6. The data array is accessed over cycles 7 and 8 to complete the service of the third request 203 with the presentation of its read data beginning in cycle 9. The fourth request 204 is a prefetch request that accesses the tag array in cycles 7 and 8 while the data array is being accessed to service the third request 203. Again, being a prefetch request, the fourth request 204 does not invoke access of the data array.

The insertion of one full cycle between consecutive services of the requests (as observed in cycles 2, 4 and 6) corresponds to a performance hit in the sense that requests are being issued to the cache at a slower rate than might be otherwise possible.

Figure 2B:
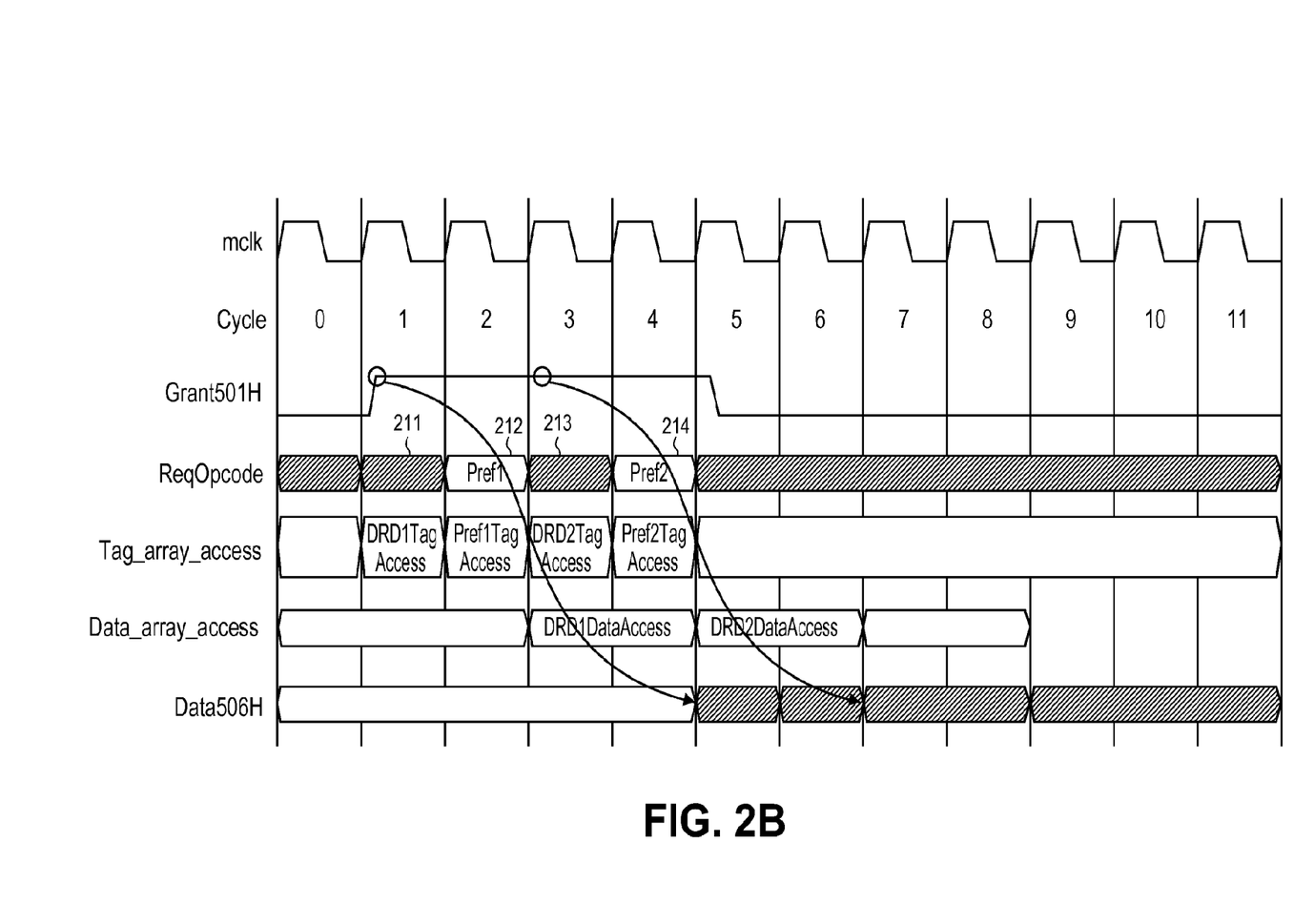
FIG. 2b shows improved cache circuit timing.

As alluded to previously, designing the tag array such that it consumes only one cycle per access can improve cache performance. FIG. 2b shows the same sequence of cache access requests as observed in FIG. 2a, but with a tag array that only consumes one cycle instead of two cycles. Again, the tag array can be made to only consume one cycle as opposed to two cycles, for example, by being designed with larger storage cells than those in the data array.

As observed in FIG. 2b, a one cycle tag array access removes the restriction that a full cycle must be inserted between consecutive cache request services, and, as such, consecutive requests can issue on consecutive cycles. Thus, as seen in FIG. 2b, the second request 212 is issued immediately after the first request 211. Here, the first request 211 consumes the tag array only for the same cycle, cycle 1, that it was serviced in which permits the servicing and access to the tag array for the second request 212 in the immediately following cycle, cycle 2.

For similar reasons the third request 213 can be serviced in cycle 3 immediately after the servicing of the second request 212 in cycle 2. Moreover, because the second request 212 is a prefetch request, it does not access the data array, which permits the third request to access the data array in cycles 5 and 6 immediately after the first request 211 accesses the data array in cycles 3 and 4. As a point of comparison, note that the read data for the first and third requests 211, 213 of FIG. 2b are available by cycle 8, whereas the approach in FIG. 2a does not present the read data until cycle 10.

Finally, the fourth request 214 is serviced in cycle 4 immediately after the third request 213 in cycle 3. This corresponds to completion of the fourth request, a prefetch request, in cycle 4, whereas, in the prior art approach of FIG. 2a the fourth request was not completed until cycle 8.

Thus, efficiency can be gained by distinguishing between requests that are known not to seek access to the data array and permitting them to be serviced immediately after a preceding cache access request and/or inserting them between accesses that may require access to the data array.

Figure 3:
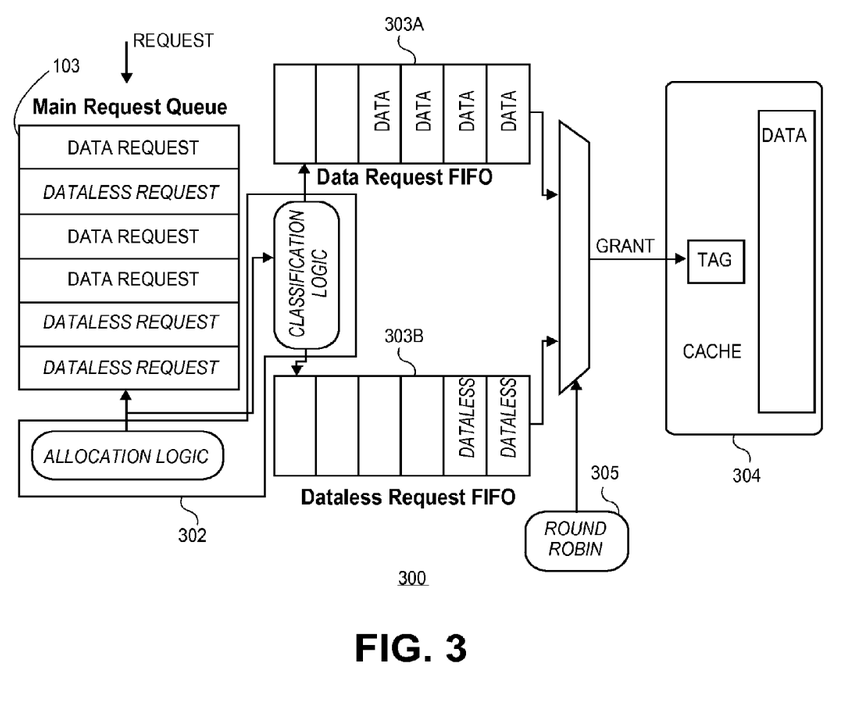
FIG. 3 shows a first embodiment of an improved cache circuit.

FIG. 3 shows an improved cache circuit approach 300 that is designed to recognize and distinguish between cache access requests that do not access the data array and those that do or might. As observed in FIG. 3, cache access requests are centrally received in a first main request queue 301. Allocation logic and classification logic 302 act to populate a next stage of FIFOs 303a,b that feed the tag array in cache 304. Here, classification logic determines, for each request in the main queue 301, whether the request is of a type that will not invoke the data array ("Dataless Request") or is of a type that will or may invoke the data array ("Data Request").

Here, FIFO 303a queues data requests from the main queue 301 while FIFO 303b queues dataless requests from the main queue 301. Arbitration logic determines when requests should be serviced from the main queue 301 and entered into one of FIFOs 303a,b (e.g., when both of FIFOs 303a,b have a slot for a next request). Round robin logic 305 alternates between FIFOs 303a,b in servicing their respective requests for issuance to the tag array in cache 304. That is, a request is first taken from FIFO 303a, then, a request is taken from FIFO 303b, then a request is taken from FIFO 303a, etc.

Figure 4:
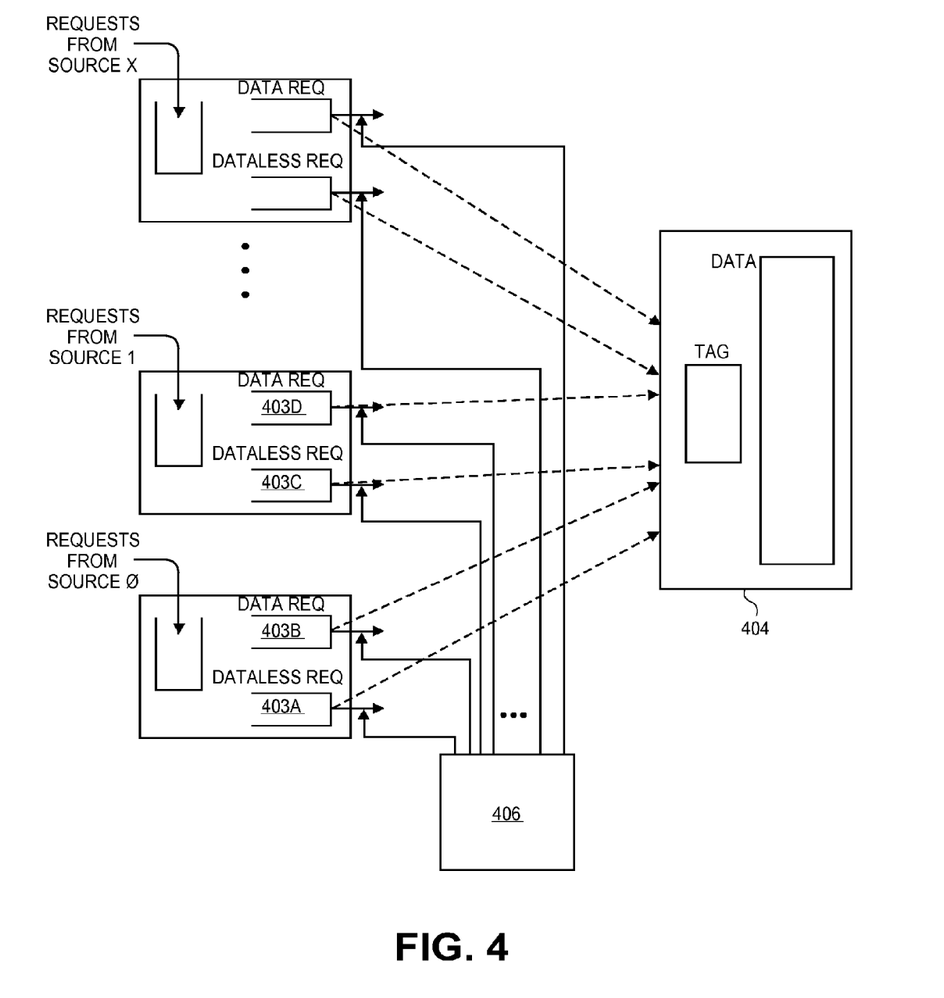
FIG. 4 shows a second embodiment of an improved cache circuit.

In this manner the tag array can be accessed every cycle. FIG. 4 shows another design in which the same design of FIG. 3 is established for all the different sources that may direct requests to the cache 404. Here, a master arbiter 406 can provide round robin service to all the sources but in a manner that alternates between data requests and dataless requests. That is, a dataless request if is first serviced from FIFO 403a, then, a data request is serviced from FIFO 403b, then, a dataless request is serviced from FIFO 403c, then, a data request is serviced from FIFO 403d, etc.

Figure 5:
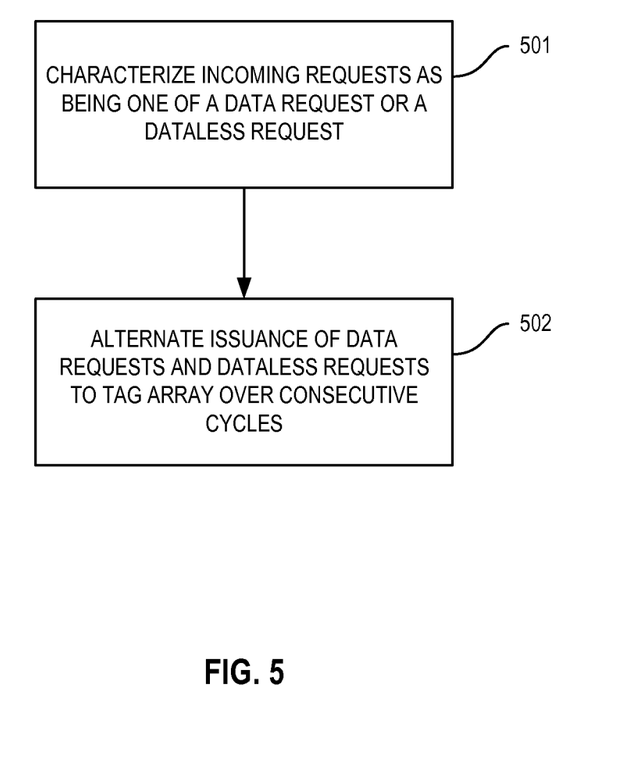
FIG. 5 shows a method performed by the improved cache circuit.

FIG. 5 shows a methodology that can be performed by the cache access circuitry of FIGS. 3 and 4. As observed in FIG. 5, incoming cache access requests are characterized as being of a data request type or a dataless request type 501. The requests are then serviced such that dataless request types are applied to the tag array of the cache on alternative cycles than data request types, where requests are issued to the tag array on consecutive cycles 502.

Figure 6:
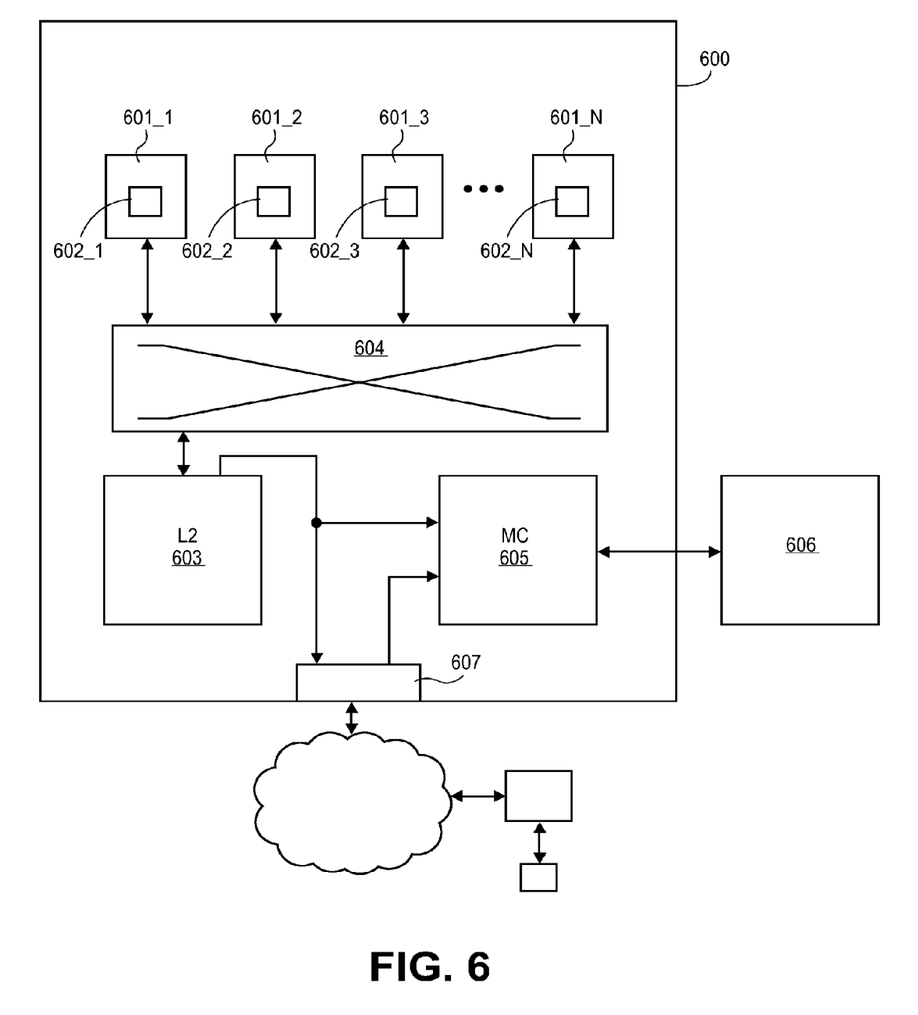
FIG. 6 shows a semiconductor chip having L1 and L2 caches.

FIG. 6 shows a semiconductor chip 600 having multiple processing cores 601_1 to 601_N, each having its own respective L1 cache 602_1 to 602_N. The cores are interconnected to one another and to an L2 cache 603 through switch (e.g., crossbar) circuitry 604. A memory controller 605 is also coupled to system memory 606. In computing systems where semiconductor chip 600 includes all the primary processing cores of the system, system memory 606 may represent all of system memory in the computing system. In this case, memory controller 605 receives all data requests that miss the L2 cache.

In larger systems that are formed by coupling one or more chips like chip 600 together, system memory 606 represents only a slice of the address range of the computing system's system memory. As such, memory controller 605 will receive data requests that miss the L2 cache whose addresses correspond to the system memory address range managed by memory controller 605. Requests outside of this range are directed from chip through communication interface 607 to whichever chip whose corresponding memory controller manages each of their associated address. Likewise memory controller 605 may receive from interface 607 data requests from other chips whose respective address correspond to the address range managed by controller 605.

The cache circuitry discussed above may be instantiated in the L1 and/or L2 caches and logic circuitry disposed on the semiconductor chip 600.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A semiconductor chip comprising:
   a cache comprising a tag array and a data array;
   a request queue to store a plurality of cache requests to access the cache;
   a data request queue to store a data request to access the data array of the cache;
   a dataless request queue to store a dataless request to access the tag array of the cache;
   allocation logic circuitry to determine a cache request is to be serviced from the request queue when both of the data request queue and the dataless request queue have a slot for a next request;
   classification logic circuitry to receive the cache request from the allocation logic circuitry and determine whether the cache request is a data request or a dataless request, and place said cache request in said data request queue if said cache request is a data request and place said cache request in said dataless request queue if said cache request is a dataless request; and
   servicing logic to issue data requests from the data request queue to the data array and dataless requests from the dataless request queue to the tag array.

2. The semiconductor chip of claim 1 wherein an access of said tag array consumes one cycle and an access of said data array consumes two cycles.

3. The semiconductor chip of claim 2 wherein said tag array consumes larger storage cells than said data array.

4. The semiconductor chip of claim 1 wherein said tag array consumes larger storage cells than said data array.

5. The semiconductor chip of claim 1 wherein said dataless request is
   a prefetch.

6. The semiconductor chip of claim 1, further comprising:
   a second data request queue;
   a second dataless request queue; and
   classification logic circuitry to determine whether a second cache request is a data request or a dataless request, and place said second cache request in said second data request queue if said second cache request is a data request and place said second cache request in said second dataless request queue if said second cache request is a dataless request,
   wherein the servicing logic is to alternate issuance of a data request from the data request queue to the data array, a dataless request from the dataless request queue to the tag array, a data request from the second data request queue to the data array, and a dataless request from the second dataless request queue to the tag array on consecutive cycles.

7. The semiconductor chip of claim 1 wherein said dataless request is a snoop.

8. A method comprising:
   providing a cache comprising a tag array and a data array, a request queue to store a plurality of cache requests to access the cache, a data request queue to store a data request to access the data array of the cache, and a dataless request queue to store a dataless request to access the tag array of the cache;
   determining a cache request is to be serviced from the request queue when both of the data request queue and the dataless request queue have a slot for a next request;
   determining whether the cache request is a data request or a dataless request, and placing said cache request in said data request queue if said cache request is a data request and placing said cache request in said dataless request queue if said cache request is a dataless request; and
   issuing data requests from the data request queue to the data array and dataless requests from the dataless request queue to the tag array.

9. The method of claim 8 wherein said dataless request is a prefetch.

10. The method of claim 8 wherein said issuing comprises controlling a mux having a first input coupled to an output of the data request queue, a second input coupled to an output of the dataless request queue, and an output coupled to the cache.

11. The method of claim 10, further comprising:
    placing a cache request in a second data request queue if said cache request is a data request;
    placing a cache request in a second dataless request queue if said cache request is a dataless request; and
    alternating issuance of a data request from the data request queue to the data array, a dataless request from the dataless request queue to the tag array, a data request from the second data request queue to the data array, and a dataless request from the second dataless request queue to the tag array on consecutive cycles.

12. The method of claim 8 wherein said dataless request is a snoop.

13. A computing system comprising:
    multiple processing cores;
    a cache comprising a tag array and a data array;
    a request queue to store a plurality of cache requests to access the cache;
    a data request queue to store a data request to access the data array of the cache;
    a dataless request queue to store a dataless request to access the tag array of the cache;
    allocation logic circuitry to determine a cache request is to be serviced from the request queue when both of the data request queue and the dataless request queue have a slot for a next request;
    classification logic circuitry to receive the cache request from the allocation logic circuitry and determine whether the cache request is a data request or a dataless request, and place said cache request in said data request queue if said cache request is a data request and place said cache request in said dataless request queue if said cache request is a dataless request; and
    servicing logic to issue data requests from the data request queue to the data array and dataless requests from the dataless request queue to the tag array.

14. The computing system of claim 13 wherein an access of said tag array consumes one cycle and an access of said data array consumes two cycles.

15. The computing system of claim 14 wherein said tag array consumes larger storage cells than said data array.

16. The computing system of claim 13 wherein said tag array consumes larger storage cells than said data array.

17. The computing system of claim 13 wherein said dataless request is
    a prefetch.

18. The computing system of claim 13, further comprising:
    a second data request queue;
    a second dataless request queue; and
    classification logic circuitry to determine whether a second cache request is a data request or a dataless request, and place said second cache request in said second data request queue if said second cache request is a data request and place said second cache request in said second dataless request queue if said second cache request is a dataless request, wherein the servicing logic is to alternate issuance of a data request from the data request queue to the data array, a dataless request from the dataless request queue to the tag array, a data request from the second data request queue to the data array, and a dataless request from the second dataless request queue to the tag array on consecutive cycles.

19. The computing system of claim 13 wherein said dataless request is a snoop.

* * * * *